United States Patent [19]

Bartoszek et al.

[11] 4,128,519

[45] Dec. 5, 1978

[54] AQUEOUS VINYLIDENE FLUORIDE POLYMER COATING COMPOSITION

[75] Inventors: Edward J. Bartoszek, Norristown; Alkis Christofas, Levittown, both of Pa.

[73] Assignee: Pennwalt Corporation, Philadelphia, Pa.

[21] Appl. No.: 761,191

[22] Filed: Jan. 21, 1977

[51] Int. Cl.² ............................................. C08L 27/16
[52] U.S. Cl. ..................... 260/29.6 NR; 260/29.6 F; 260/29.6 RW
[58] Field of Search ................... 260/29.6 F, 29.6 NR, 260/29.6 RW

[56] References Cited

U.S. PATENT DOCUMENTS

| | | | |
|---|---|---|---|
| 3,111,426 | 11/1963 | Capron et al. | 260/837 R |
| 3,169,120 | 2/1965 | Capron et al. | 260/29.6 F |
| 3,719,629 | 3/1973 | Martin et al. | 260/33.4 EP |
| 3,857,827 | 12/1974 | Dohaney | 260/29.6 F |
| 3,962,169 | 6/1976 | Arruda et al. | 260/29.6 F |

Primary Examiner—Eugene C. Rzucidlo

[57] ABSTRACT

A water-based coating composition which may be air dried to form durable, fire resistant coatings includes dispersed vinylidene fluoride polymer particles, emulsified liquid epoxy resin and a dissolved emulsifying agent for said epoxy resin which agent is also capable of rapidly curing the epoxy resin upon removal of the water from the composition.

6 Claims, No Drawings

AQUEOUS VINYLIDENE FLUORIDE POLYMER COATING COMPOSITION

The invention described herein was made in the performance of work under NASA Contract No. NAS 9 - 14403 and is subject to the provisions of section 305 of the National Aeronautics and Space Act of 1958 (72 Stat. 435; 42 U.S.C. 2457).

This invention relates to an air-drying latex, topcoat formulation including components which are compatible and relatively stable in a liquid composition. Resinous vinylidene fluoride polymer is present in the formulation as the film-former while a liquid epoxy resin and a water-soluble emulsifier for the epoxy resin, which is also a curing agent for the epoxy after removal of the water, provide additional beneficial coating properties.

Various systems have been devised for laying down films and protective coatings of normally solid, high molecular weight vinylidene fluoride polymers to give substrates the protection of polymeric coatings which have good solvent resistance, chemical resistance, weather resistance, heat stability, strength, and resilience. However, these known systems have certain disadvantages with regard to processing conditions and environmental contamination. For example, U.S. Pat. No. 3,169,120 describes vinylidene fluoride polymer particles dispersed in an aqueous composition containing a major proportion of at least one water miscible solvent selected from the group consisting of triethylphosphate, dimethyl succinate, diethyl succinate and tetraethylurea. The disadvantages of this system are the presence of large amounts of undesirable, high boiling point solvents and the necessity for drying and curing the polymer film at temperatures in excess of about 175° C. U.S. Pat. Nos. 3,324,069 and 3,340,222 deal with film-forming compositions comprised of vinylidene fluoride polymer and an acrylate polymer dispersed in a latent solvent for the vinylidene fluoride polymer, the latent solvent being a volatile organic liquid. The polymer films and coatings formed from such non-aqueous dispersions are dried and cured at temperatures on the order of 230° C. With the ever increasing emphasis being placed on environmental protection, the presence of large amounts of such volatile and toxic organic solvents in coating compositions is objectionable because of their air-polluting effects.

High quality vinylidene fluoride polymer films and coatings can be prepared from the non-polluting, substantially solvent-free, coating composition of this invention which coating composition permits drying and curing of the formed coatings at ambient temperature, i.e., about 15° to 50° C., although, if desired, the films and coatings may be quickly dried and cured at high temperature, i.e., up to about 290° C. The dried and cured coatings have superior hardness, abrasion resistance, adhesion properties, flexibility, resistance to chemicals, corrosion protection, weathering properties, thermal stability, fire resistance, and clarity.

Accordingly, this invention comprises an aqueous coating composition containing for each 100 parts by weight of aqueous liquid medium from about 25 to about 125, preferably about 30 to about 70, parts of dispersed vinylidene fluoride polymer particles and from about 3 to about 50, preferably about 8 to about 20, parts of emulsified liquid epoxy resin, and, for each part by weight of liquid epoxy resin, from about 0.25 to about 2.5, preferably about 1.0, parts of emulsifying agent for said epoxy resin which agent is capable of rapidly curing said epoxy resin on removal of water from said composition.

By the term "vinylidene fluoride polymer" used herein is meant not only the high molecular weight normally solid homopolymer resin of vinylidene fluoride but also the high molecular weight normally solid copolymers of vinylidene fluoride with at least one comonomer, for example, those selected from the group consisting of tetrafluoroethylene, trifluoroethylene, chlorotrifluoroethylene, hexafluoropropene and mixtures thereof, said copolymers consisting of at least about 50 mole % of polymerized vinylidene fluoride units. A particularly preferred copolymer (terpolymer) is that composed of about 62 weight percent vinylidene fluoride, about 24 weight percent of tetrafluoroethylene, and about 14 weight percent of hexafluoropropene. The vinylidene fluoride polymer is present in the dispersion embodied herein as dispersed particles having a particle size range of 0.1 micron or smaller up to about one micron.

Examples of the emulsifiable, liquid epoxy resins which are usually employed for the composition of this invention are set forth in U.S. Pat. No. 3,719,629. The patent discloses glycidyl ethers of polyhydric compounds which include, for example, glycidyl ethers of phenols, bisphenols, phenol-aldehyde condensation products, glycols, polyoxyalkylene glycols and the like, or mixtures of such glycidyl ethers. One preferred epoxy resin component for this invention is a blend of from about 10–12 parts by weight of a liquid epoxy resin of the diglycidyl ether of bisphenol A with from about 1–3 parts of a liquid epoxy resin of the diglycidyl ether of propylene glycol.

The emulsifying agent for the liquid epoxy resin which also acts as a curing agent for the epoxy resin when the composition is dried, is advantageously selected from aminoalkylated vinyl interpolymers of the type described in U.S. Pat. No. 3,634,372 wherein the aminoalkyl radical is acidified. The acidification of such copolymers to provide water thinnable coating composition with dispersed epoxy resin is also disclosed in the above mentioned U.S. Pat. No. 3,719,629, and the disclosure of both of the above patents are incorporated herein by reference. The aminoalkylated copolymers are further characterized as having pendant aminoalkylate groups of the formula

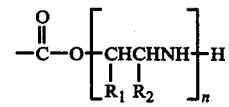

where $R_1$ and $R_2$ are independently hydrogen or lower alkyl radicals, and n ranges from about 1.0 to 2.5. The intermediate vinyl carboxylic acid interpolymers are prepared, for example, by copolymerizing a vinyl carboxylic acid, e.g., acrylic, methacrylic, cinnamic, crotonic acid and the like, with one or more copolymerizable monomers such as vinyl aromatic and aliphatic monomers. Preferable vinyl aromatic monomers are styrene, α-methylstyrene, and vinyl toluene. Preferable vinyl aliphatic monomers are methyl, ethyl, isopropyl, butyl and 2-ethylhexyl acrylates or methacrylates. The vinyl interpolymers are preferably prepared with a sufficient amount of vinyl carboxylic acid monomer to provide at least 3 percent and preferably from about 7.5 to about 12 percent by weight of carboxylic acid (as —COOH) and the balance of said interpolymer composed of the preferred comonomers as indicated above.

The aminoalkylated interpolymers employed in this invention are prepared by an amination reaction in which the vinyl carboxylic acid interpolymer in a suitable solvent is reacted with an excess (at least two moles) of alkylenimine or N(aminoalkyl)-substituted alkylenimine. Suitable alkylenimines include ethylenimine, propylenimine, butylenimine and the like and mixtures thereof. Particularly useful N(aminoalkyl)-substituted alkylenimines are N-(2-aminoethyl)aziridine, N-(3-aminopropyl) aziridine, N-(2-aminopropyl)propylenimine and the like.

The acidification of the aminoalkylated vinyl polymer can be accomplished by the simple mixing of the polymer and acid in a suitable water miscible solvent or solvent blend using, as the acid, one which will form an acid salt with the pendant amine moieties. For example, suitable acids include hydrochloric acid, phosphoric acid, formic and acetic acid. The emulsifying agent is advantageously employed to formulate coating composition as a suspension in an inert liquid carrier, preferably water or a mixture of water and a water miscible solvent.

Coating composition additives may be, and preferably are, used for the composition of this invention. Dispersed, finely-divided pigments to give the coating or film the desired opacity, color or aesthetic appeal are used in amounts ranging from about 10 to about 170 parts by weight of pigment for each 100 parts by weight of vinylidene fluoride polymer resin with the provision, however, that total solids in the dispersion is not greater than about 200 parts per 100 parts by weight of water. Representative pigments are rutile titanium dioxide, various silicates such as talc, mica and clays, barytes, carbon black, zinc oxide, zinc sulfide, silicas, iron oxides, chrome oxides, other metal oxides, powdered metals, glass spheres, and mixtures of the foregoing pigments.

An optional ingredient that may be included in the dispersion, in an amount of up to about 20 parts by weight per 100 parts by weight of the amount of vinylidene fluoride polymer resin, is an organic liquid, preferably soluble in water in said proportion, which liquid will act as a coalescing aid in the formation of the polymer films during the drying step. Representative coalescing agents which may be used in such minor proportions are butyrolactone, cyclohexanone, tributyl phosphate, methyl or butyl cellosolve acetate, tributoxyethyl phosphate, carbitol acetate.

Conventional paint and coating additives, such as surfactants, anti-foams, preservatives, protective colloids, thickening agents, pH buffers and others may also be included in the composition. The preferred pH for the composition of this invention is in the range of about 5 to about 6.

The coating compositions can be applied to a wide variety of substrates including wood, metals, masonry, textiles, fabrics, paper, glass, etc. by conventional coating methods such as spraying, brushing, dipping, casting, knife coating, coil coating, reverse roll coating and other methods known in the art. The unexpected advantages of the aqueous dispersion of this invention derive from the discovery that durable, hard, and tough coatings are obtained by air-drying at ambient temperatures i.e., 15° to 50° C. Accordingly, the coatings may be applied as high performance maintenance paints in plants and other commercial facilities to protect wood and metal surfaces.

Although adhesion of the film of the polymeric mixture to substrates is generally more than adequate, increased adhesion is obtained by first priming the substrates with a compatible coating layer. For example, for wood, a useful primer is a layer of pigmented acrylic acid ester polymer as described in U.S. Pat. No. 3,234,039 and in U.S. Pat. No. 3,037,881. For metal coatings, a preferred primer layer is described in U.S. Pat. No. 3,111,426, that is an epoxy-based primer. Acrylic based primers are also useful for metals, as described in U.S. Pat. No. 3,526,532. For coatings on glass cloth or other flexible substrates, woven or non-woven, known adhesion promoters may be used. In particular, glass fiber may be first treated with a silane coupling agent as described by I. L. Fan & R. G. Shaw, Rubber World, June 1971, page 56. Air-drying of the aqueous base polymer coatings on substrates such as paper, glass fiber, glass cloth, and non-woven textiles may be accomplished at ambient temperatures with drying periods of from about 3 to 24 hours. However, with forced air-drying at about 50° C. the films will dry in 10 to 15 minutes. At 60° C. about 5 to 10 minutes are adequate using forced air-drying. In all cases, coatings of the polymers mixture are smooth, glossy, and uniform, and the films adhere tenaciously to the substrate. Flame resistance and hydrophobicity are imparted by the The following example is set forth to further demonstrate this invention.

EXAMPLE

A paint composition was prepared from a three component system as follows:

| PART A | | |
|---|---|---|
| Aminoethylated hydrochloride salt of acrylic copolymer (XD - 7080)** (49% solids in aqueous medium) | 50 | grams (g.) |
| Pigment (finely-divided TiO$_2$) | 100 | g. |
| Defoamer (DAPRO DF 911) | 0.6 | g. |
| Cyclohexanone | 8.0 | g. |
| Dionized water* | 75. | g. |
| PART B | | |
| Liquid epoxy resin of diglycidyl ether of bisphenol A (DER 331)** | 18.5 | g. |
| Liquid epoxy resin of diglycidyl ether of propylene glycol (DER 732)** | 3.4 | g. |
| Methyl Cellosolve Acetate | 6.1 | g. |
| The above components of Part B are mixed together to obtain a homogeneous mixture. | | |
| PART C | | |
| Latex of resinous terpolymer of 62 wt. % vinylidene fluoride 24 wt. % tetrafluoroethylene and 14 wt. % hexafluoropropene (52.4% resin in aqueous medium) | | |
| | 192.9 | g. |

*Water is added with low shear mixing after dispersing other components at high shear.
**Products of Dow Chemical Co.

Part B is added to Part A with gentle stirring. When a homogeneous mixture is obtained, Part C is added in a similar fashion. The resulting paint has an epoxy resin-curing agent content of about 31.5% of total resin solids in the composition and is shelf stable for up to six days at room temperature. It can be applied by brush, roller, or spray to metals such as aluminum, steel, and titanium and to wood. The coating dries to the touch in about one hour under ordinary ambient temperature and humidity conditions and is fully cured after 24 hours. The cured coatings show hardness, adhesion, abrasion resistance, flexibility, resistance to chemicals, and thermal stability as good or better than those of commercial solvent-based polyurethane or polyester coatings. Excellent corrosion protection is obtained when the coating is applied over a conventional primer containing rust inhibitors, e.g., acrylic or epoxy primer either latex or solvent-based. In addition, the coating has excellent weathering properties as determined by accelerated tests and is self-extinguishing when applied to nonflammable substrates.

Similar coating preparations employing other vinylidene fluoride polymer resins and other liquid epoxy resins or combinations thereof are prepared in a like manner and display excellent modified coating properties.

The coating compositions of this invention are unique in that they are easily prepared compatible compositions which provide improved coating properties.

We claim:

1. An aqueous coating composition comprising, for each 100 parts by weight of aqueous liquid medium, from about 25 to about 125 parts of dispersed polymer particles of vinylidene fluoride homopolymer or copolymer of at least 50 mol percent vinylidene fluoride copolymerized with at least one other copolymerizable monomer and from about 3 to about 50 parts of emulsified liquid epoxy resin, and, for each part by weight of liquid epoxy resin, from about 0.25 to about 2.5 parts of an emulsifying agent comprising an acidified aminoalkylated polymer having pendant aminoalkylate groups of the formula

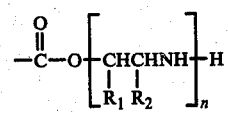

wherein $R_1$ and $R_2$ are independantly selected from the group consisting of hydrogen and lower alkyl radicals having 1 to 4 carbon atoms and the average value of n ranges from about 1.0 to 2.5, and wherein said aminoalkylated polymer before aminoalkylation contains at least 3% by weight pendant-COOH groups.

2. The composition of claim 1 wherein the vinylidene fluoride polymer is a copolymer of about 62 weight percent vinylidene fluoride, about 24 weight percent tetrafluoroethylene and about 14 weight percent of hexafluoropropene.

3. The composition of claim 1 wherein the liquid epoxy resin consists of a mixture of from about 10 to about 12 parts by weight of a liquid epoxy resin of the diglycidyl ether of bisphenol A and from about 1 to about 3 parts by weight of a liquid epoxy resin of the diglycidyl ether of propylene glycol.

4. The composition of claim 1 which contains from about 10 to about 170 parts by weight of dispersed, finely-divided pigment for each 100 parts by weight of vinylidene fluoride polymer.

5. The composition of claim 2 wherein the liquid epoxy resin consists of a mixture of from about 10 to about 12 parts by weight of a liquid epoxy resin of the diglycidyl ether of bisphenol A and from about 1 to about 3 parts by weight of a liquid epoxy resin of the diglycidyl ether of propylene glycol.

6. The composition of claim 5 which contains from about 10 to about 170 parts by weight of dispersed, finely-divided pigment for each 100 parts by weight of vinylidene fluoride polymer.

* * * * *